United States Patent [19]

Rains

[11] 4,148,485
[45] Apr. 10, 1979

[54] DRIVING GAMES METHOD FOR AUTOMATICALLY CONTROLLED CARS

[75] Inventor: Lyle V. Rains, San Jose, Calif.

[73] Assignee: Atari, Inc., Sunnyvale, Calif.

[21] Appl. No.: 834,702

[22] Filed: Sep. 19, 1977

[51] Int. Cl.² .............................................. A63F 9/14
[52] U.S. Cl. ........................... 273/86 B; 273/DIG. 28
[58] Field of Search ................... 273/1 E, 85 G, 86 B, 273/DIG. 28; 340/324 A, 324 AD; 358/93, 903; 364/200, 900, 200 MS File, 900 MS File, 410

[56] References Cited

U.S. PATENT DOCUMENTS

| | | | |
|---|---|---|---|
| 3,777,410 | 12/1973 | Robinson | 35/9 B |
| 3,874,669 | 4/1975 | Ariano | 273/85 G |
| 4,016,362 | 4/1977 | Bristow et al. | 273/DIG. 28 |
| 4,026,555 | 3/1977 | Kirschner et al. | 273/102.2 R X |
| 4,034,983 | 7/1977 | Dash et al. | 273/85 G |
| 4,045,789 | 8/1977 | Bristow | 273/DIG. 28 X |
| 4,053,740 | 10/1977 | Rosenthal | 364/900 X |

Primary Examiner—Vance Y. Hum
Attorney, Agent, or Firm—Townsend and Townsend

[57] ABSTRACT

In a race car type video game one or more manually controlled player cars race against automatic computer controlled "drone" cars whose courses are controlled by direction vectors associated with cells into which the entire track is divided. The relationship of the cars direction and angular orientation or rotation with respect to the vector is controlled in a manner to provide cumulative minor response variations so that the drone car path may change for each circuit of the track. In an alternate game the drone cars by themselves may be controlled in speed only by competing players (with the computer by the use of the direction vectors controlling steering) to simulate a mechanical slotted track racing game where the car can be skidded from one "slot" to another.

12 Claims, 10 Drawing Figures

DRIVING GAMES METHOD FOR AUTOMATICALLY CONTROLLED CARS

BACKGROUND OF THE INVENTION

The present invention is directed to a driving game with automatically controlled cars and more specifically to a game having a video output display where a player operates manual controls to compete against the automatically controlled cars or alternatively to control their speeds.

Several video driving games are now being sold including those manufactured by the present assignee. However, these all include a track layout where several driver controlled cars compete with each other. At the present time there is no driving game with effective and realistic and automatic traffic. There are some driving games with simulated traffic where, for example, the player controlled car will move down a simulated highway while trying to avoid other cars which are automatically controlled. However, these automatic cars have a fixed orientation and repetitive motion and do not provide a realistic simulation of a closed loop track.

One obvious solution to the foregoing is, of course, a brute force technique where a specific track or course for each automatically controlled car is laid out in total detail in computer memory. Where serveral automatically controlled cars with nonidentical paths are desired this is prohibitively expensive since each unique path would need a separate set of data; this requires a large amount of memory. More importantly, fixed and predetermined courses for these cars are not realistic. This is especially true in the simulation of a mechanical slotted racetrack car game where skidding off the track due to excessive speed is a quintessential part of the game.

Finally, if it is desired to switch to different track layouts the brute force system does not easily facilitate such track changes.

Objects and Summary of the Invention

It is, therefore, an object of the present invention to provide an improved driving game with automatically controlled cars.

In accordance with the above object there is provided a driving game where at least one controlled car is driven on a track. The track is divided into cells and each is assigned a direction vector with each vector being assigned different directions in accordance with the change of direction of the track. Movement of the car is initiated along the track. The direction vector of the car which represents its current direction of motion on the track and its cell position are intermittently sensed. The car vector is compared to the assigned vector of the cell position and the direction vector of the car is incremented toward the assigned vector direction.

BRIEF DESCRIPTION OF THE DRAWINGS

Tables I and II are microprocessor assembly listings used in the present invention.

DETAILED DESCRIPTION OF THE PREFERRED EMBODIMENTS

Figures 1, 1A, 1B:
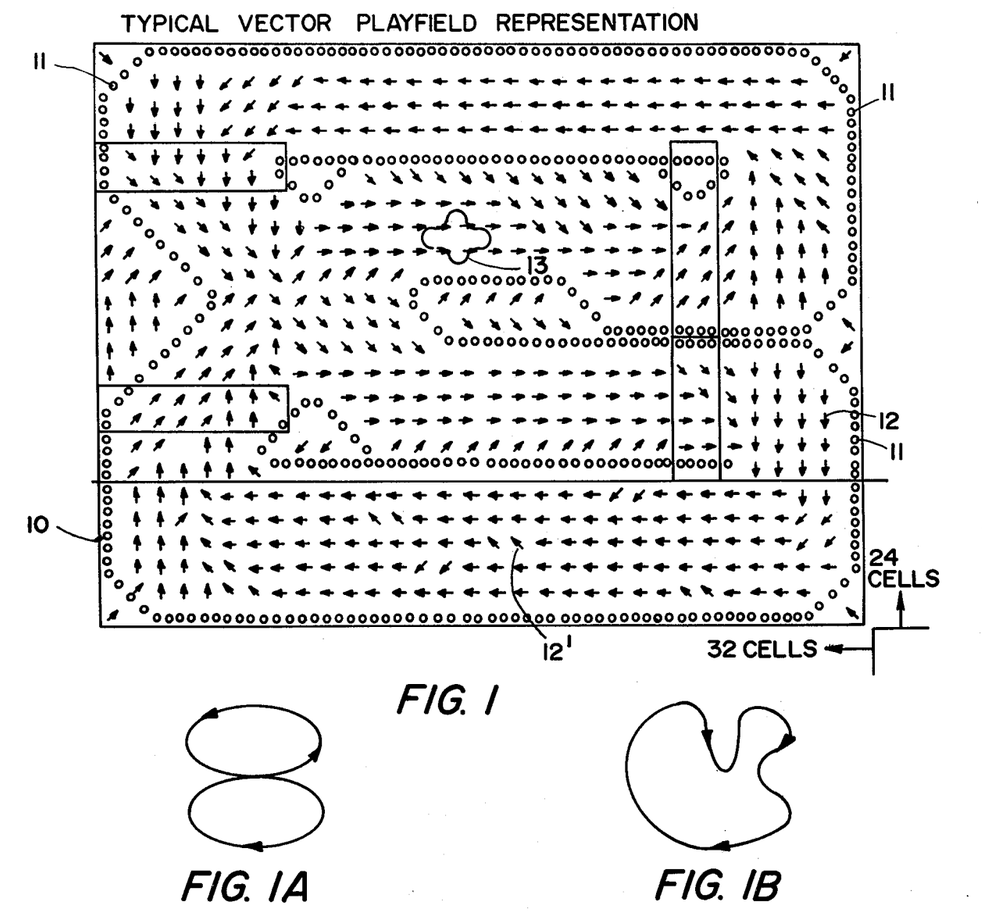
FIG. 1 is a vector representation of a video playfield or car track embodying the present invention.
FIG. 1A shows the track of FIG. 1 in simplified form.
FIG. 1B shows an alternative simplified track.

FIG. 1 illustrates a typical track which is displayed on a video screen 10. The track's figure eight configuration is illustrated in FIG. 1A. The configuration of the track itself is formed by the video display of dots 11. The associated vectors which show the track course are not actually displayed but as will be discussed below they control the motion of the computer controlled or automatic cars.

In general the present video game illustrated in FIG. 1 is a car racing game which is played by one or more players and where each player has manual controls consisting of a steering wheel, gear shift knob and accelerator. If only one player is racing, he competes against three automatically controlled or drone cars (not illustrated). These all start at, for example, the bottom right hand corner of the screen.

As is apparent from examination of the video screen 10 of FIG. 1 it is divided into 32 cells in the horizontal direction and 24 in the vertical direction. There is one direction vector assigned for each cell. If two players compete against each other, then two drone cars are provided on the screen along with the players' manually controlled cars. As described above, such game is now being sold by the assignee of the present application under the trademark SPRINT 2. The game has the capability of the selecting from one of twelve different track layouts. FIG. 1B illustrates another track layout where a different set of vectors would, of course, be provided in accordance with the change of directions of the track. In order to add realism to the game as shown in FIG. 1, a grease spot or oil slick 13 is added. In general, the car that travels farthest wins the race. Hitting other cars causes temporary loss of control; collision with the wall causes the car to stop momentarily.

Figure 2:
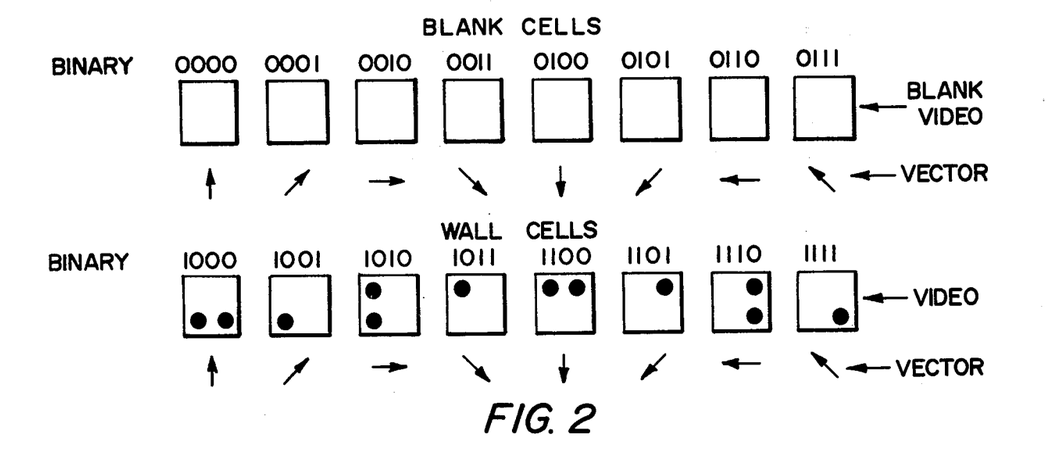
FIG. 2 illustrates cells used to form the track of FIG. 1.

FIG. 2 illustrates how each cell of the play field of FIG. 1 is assigned a direction vector. The cells labeled "blank cells" provide the vectors 12 in eight different directions. There is a four bit binary number illustrated above and associated with the cell the three least significant bits indicating eight different vector directions and the fourth most significant bit being zero to indicate a blank cell. Below are shown "wall cells" with the actual walls 11 in their different orientations indicated. The wall cells actually produce the video output as indicated to form any needed track layout. Also associated with each wall cell is a direction vector which tends to move an automatically controlled car away from the wall in the direction of the vector if a drone car should hit the wall. Again there is a four bit binary number three of the bits describing eight different vector directions and the fourth most significant bit, a "1", indicating a wall cell.

In general it may not be necessary to provide wall cell vectors. However, in the present game where as will be more readily understood below the drone cars although computer controlled still have a somewhat variable path and the wall cells with "rebound" vectors enhance this capability. Also, since in the present game a track may change at any time, e.g.; from FIG. 1A to 1B, a wall may appear under a drone car. The direction vector inherent in the wall code will then steer the drone car back onto the track. Along this line, examination of FIG. 1, for example, at 12' illustrates a discontinuity in the direction vector pattern. This deliberate discontinuity and several others which are easily noted by examination cause the drone cars to take different paths for each circuit of the track. There are still other reasons for the different paths which will be discussed below.

In practice the cell vectors of the track are laid out to generally follow the change of direction of the track keeping in mind the desire for path variation. In addition it is undesirable to repeatedly hit the walls of the course.

Figures 3, 3A:
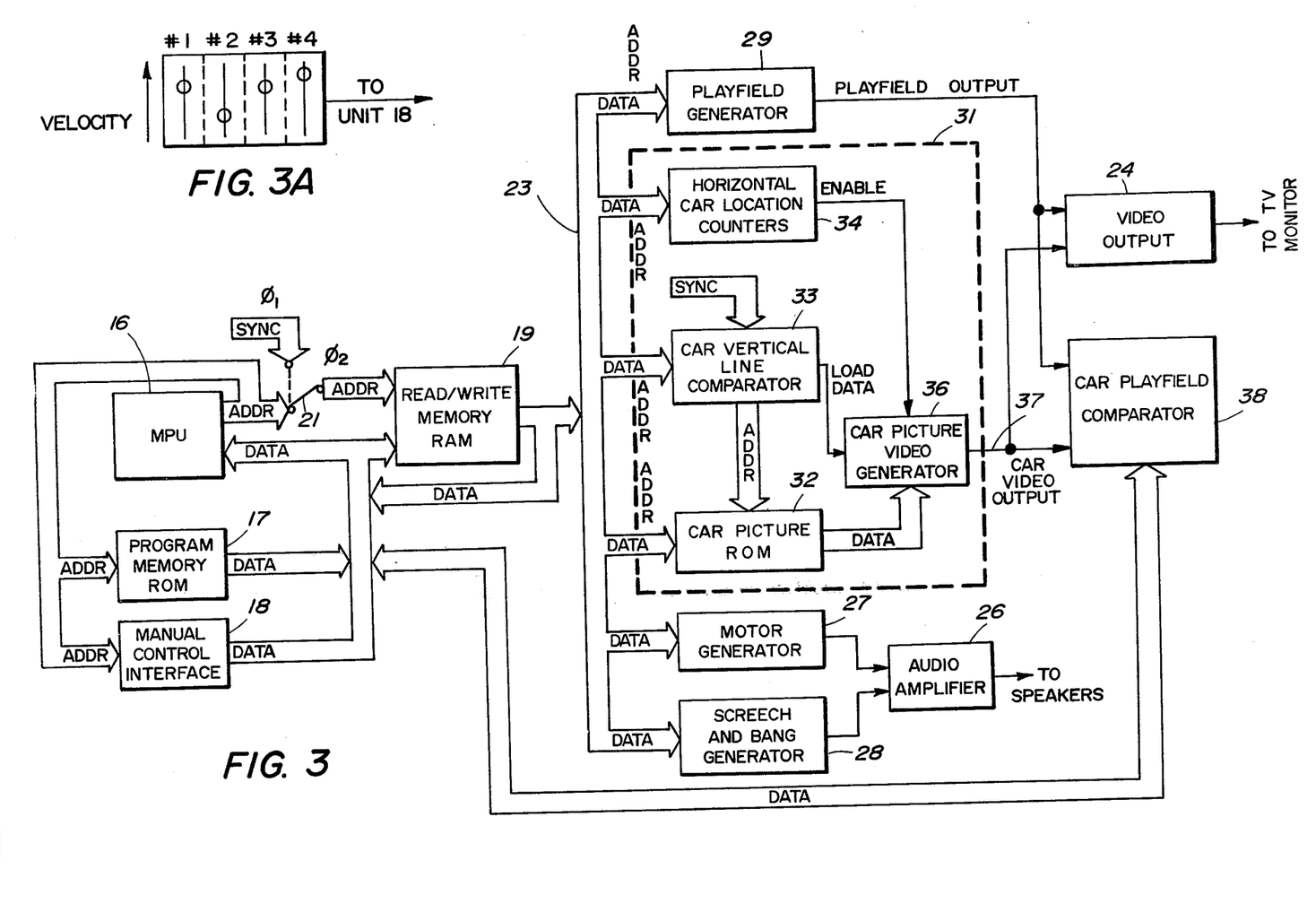
FIG. 3 is a block circuit diagram embodying the present invention.
FIG. 3A is a simplified top view of manual controls used in conjunction with FIG. 3 in an alternative embodiment.

FIG. 3 is a block circuit diagram of the present invention where overall control is provided by a microprocessor unit (MPU) 16. Such unit has a program memory read only memory (ROM) 17 and a manual control interface unit 18 which, for example, would be connected to the steering wheel, gear shift and accelerator for each player. All of the foregoing units are interconnected through appropriate address and data buses to MPU 16 which can access a playfield read/write random access memory (RAM) 19. Proper synchronization is provided by the switch 21 movable between $\phi_1$ and $\phi_2$.

A data bus 23 couples the playfield RAM 19 to logic means, which provide a video output at 24 to the TV monitor, and to an audio amplifier 26 which drives loud-speakers. Such audio output is activated using either a motor generator 27 or a screech and bang generator 28.

A playfield or graphics generator 29 responds to the binary output of playfield memory 19 and converts such data into format suitable for video output unit 24. For example, it would convert the binary four bit information illustrated in FIG. 2 for the wall cells to actual video information.

Dashed block 31 contains the logic for controlling the car motion. A prior and somewhat similar technique to control object movement with the use of manual player controls is disclosed and claimed in a copending application, Ser. No. 706,121, filed July 16, 1976, in the name of Steven T. Mayer et al., entitled "Method For Generating a Plurality of Moving Objects on a Video Display Screen" and is assigned to the present assignee.

A car picture read only memory 32 contains a binary picture of a car in any one of 32 angular orientation or rotation positions. To describe such orientations from a binary logic standpoint requires a five bit binary number; that is, $2^5$. Picture memory 32 is addressed by a car vertical line comparator 33 which receives either the manual control inputs from a player or the automatic position changes from the microprocessor unit 16 to cause a change in the vertical position, VPOST, of the car. In other words, car vertical line comparator 33 effectively stores the current vertical position of every car and is updated once every frame or during the vertical blanking period. Similarly, the horizontal car location counter 34 keeps track of or memorizes the horizontal locations, HPOST, of all the cars. In summary both the counter 34 and the comparator 33 locate the car, either manual or drone, on the video display screen.

However vertical comparator 33 also stores the current car picture number which addresses the car picture ROM 32 to provide the specific rotation (that is, one of 32 angular positions) of the car. Lastly ROM 32 sends data to car picture video generator 36 which also receives location instructions from counter 34 and comparator 33 to provide an output on line 37. This video output drives the video output unit 24 to display the car.

A car playfield comparator 38 compares the actual video collisions of manually controlled cars with playfield boundaries, oil slicks, on the other cars.

Figure 4:
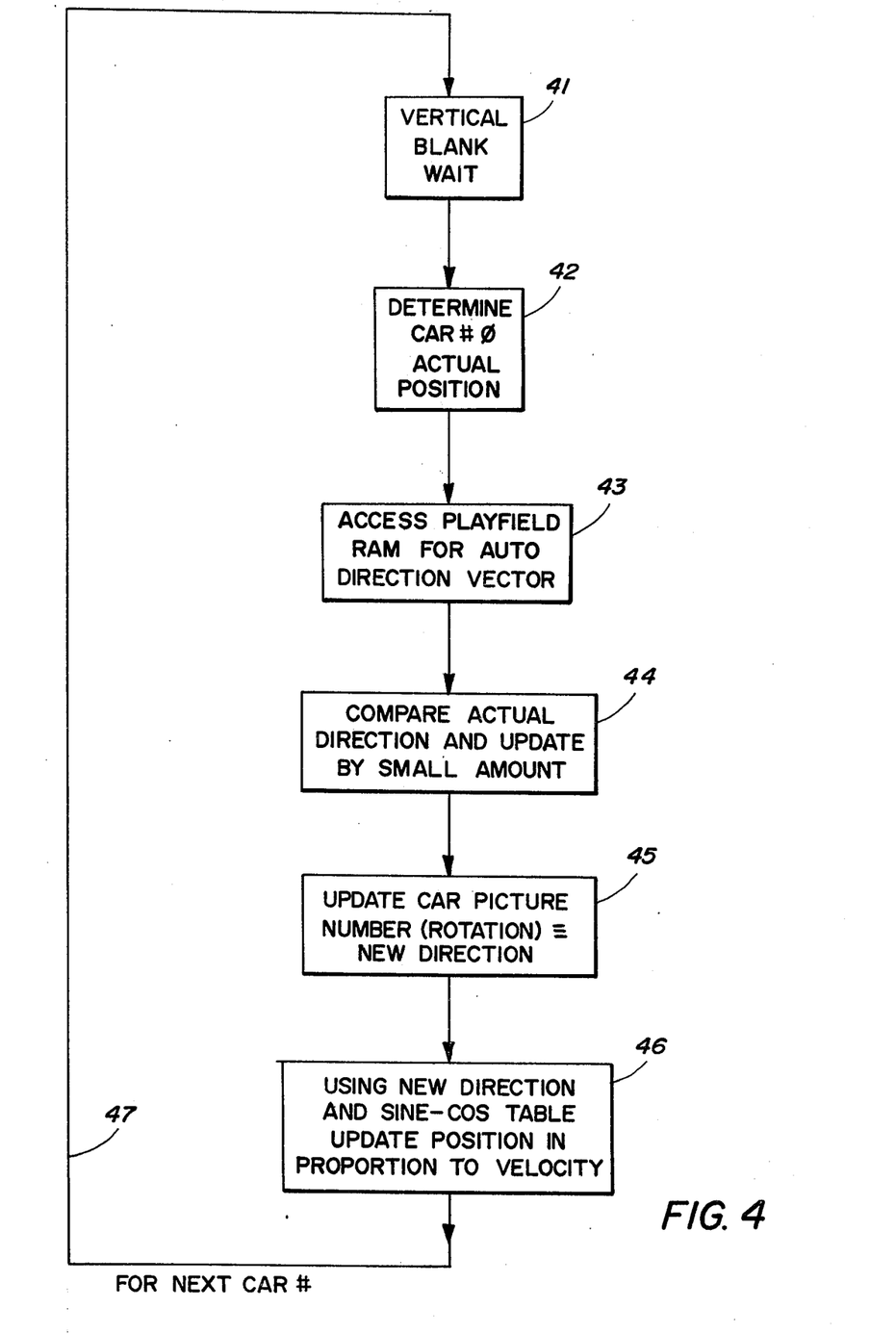
FIG. 4 is a flow chart of one embodiment of the invention.
Figure 5:
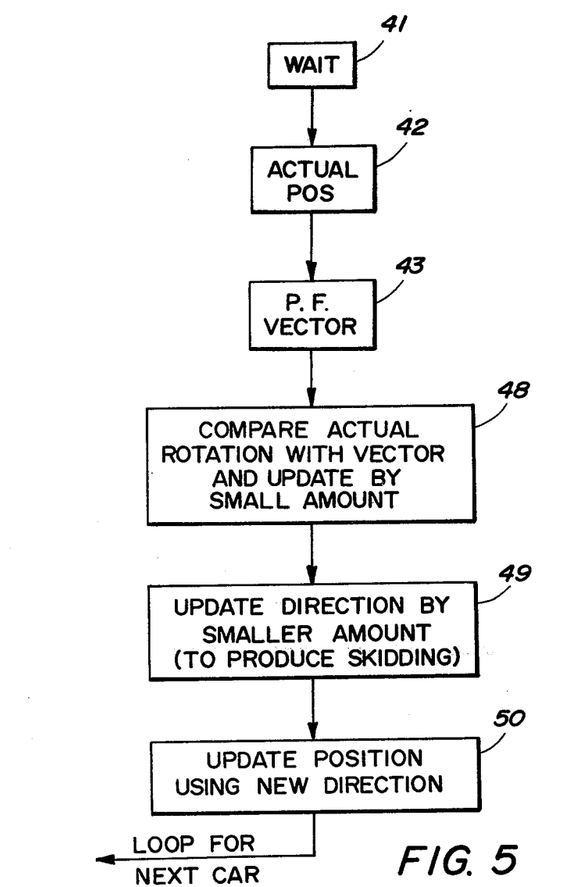
FIG. 5 is a flow chart of another embodiment of the invention.

The flow charts of FIGS. 4 and 5 demonstrate how the cell or auto-direction vectors of FIG. 1 control the position of the automatically controlled or drone cars on the playfield. In general each car may have as many as five position variables. These are horizontal and vertical position (HPOST and VPOST), rotation (in 32 angular orientations as discussed in conjunction with the car picture ROM memory 32 of FIG. 3), direction, and velocity.

In the embodiment of FIG. 4 the current direction of movement of a drone car is made identically equal to the angular orientation or rotation of the car. However, as will become apparent from the flow chart modification of FIG. 5 if it is desired to realistically simulate the skidding of a car around a corner, the direction or path of the car will necessarily have a slower rate of change than rotation (angular orientation). For example, in making a turn the car could have been rotated 90° but still be sliding sideways in its original direction. The foregoing will be discussed with the embodiment of FIG. 5.

Referring now to FIG. 4 it will be assumed that the playfield random access memory 19 of FIG. 3 has been loaded with all of the direction vectors of the particular track being used. The program of FIG. 4 is not executed until the vertical blanking period occurs illustrated as step 41. In step 42 the actual position of the drone car is determined from the horizontal and vertical storage units 33, 34. Next in step 43 playfield RAM 19 is accessed for the automatic direction vector 12 which is associated with that particular cell position. Comparison occurs in step 44 and if there is a difference, the actual direction of car is updated a small amount which is usually less than the difference between the car direction vector and the automatic direction vector to smooth motion. As shown in FIG. 2 there are only eight different possible angular orientations of the automatic direction vectors, whereas the car may have one of 32. Thus, in step 45 the car picture number (which addresses the car picture ROM 32 for the angular orientation or rotation of the car) is updated or incremented in accordance with the comparison of step 44 so that the rotation is identical to the new direction.

The foregoing can be implemented in a digital logic manner assuming, for example, there is a five bit register which would have 32 different angular orientations or in other words, a five bit binary number. The updating would occur by incrementing a additional three bit precision register which of course, will not overflow into the five bit register until it is incremented at least eight times which would increment the picture number (i.e., rotation) by one. This is a typical example of updating by a small amount.

Such a generalized updating technique has been used in other car games in a manual control mode for providing smoother motion. But there was no use of automatic direction vectors.

The last step of FIG. 4 is step 46 where using the new direction and a sine-cosine table the position in, for example, the motion unit 31 of FIG. 3 is updated in proportion to velocity. This is accomplished by an algorithm, for example, where the vertical position is equal to the sine of the direction times the velocity plus the old vertical position. The horizontal position is computed by similarly using the cosine function. Finally upon the execution for one drone car a return path 47 accomplishes the foregoing for the next drone car so that in the example illustrated in the present embodiment the positions of all three drone cars will be updated during one vertical blanking period.

In the above embodiment of the invention each drone car has its own unique maximum or terminal velocity but they are initially started at lower velocities. The velocity update occurs where the velocity is less than a maximum and then a small incremental velocity is added until the velocity reaches a maximum amount. Such variation of velocity provides a more realistic and varied action of the drone cars. More specifically the path or line which a drone car takes around a curve in the track is dependent upon the parameters of velocity, cell size, and the video frame rate which determines the frequency of updating direction. For example, if a car is moving around a corner at a relatively high velocity its path will be wider since the cell direction vectors will have less time to increment the cars actual direction to the new direction. Thus a skidding effect is produced. Also a banking turn is effected. For example in the lower left corner of the track of FIG. 1, with a higher speed wider turn the vertical cell vectors will be encountered more quickly; and then the wall vectors (1010, FIG. 2) which point in the opposite direction.

The foregoing significant effect of velocity is utilized in a "slot car" embodiment which will be discussed later.

FIG. 5 is an alternative embodiment where steps 41, 42, 43 are similar but in the comparison step 48 the rotation rather than the direction is updated by a small amount. Then as illustrated in step 49 to provide more realistic skidding action, as discussed above, the direction of the car is updated by a smaller amount. From a practical standpoint in the digital logic this means that an additional register must be provided; in other words, two registers, one for rotation information and one for direction information. Lastly, in step 50 the new position is provided by the direction information.

Figure 6:
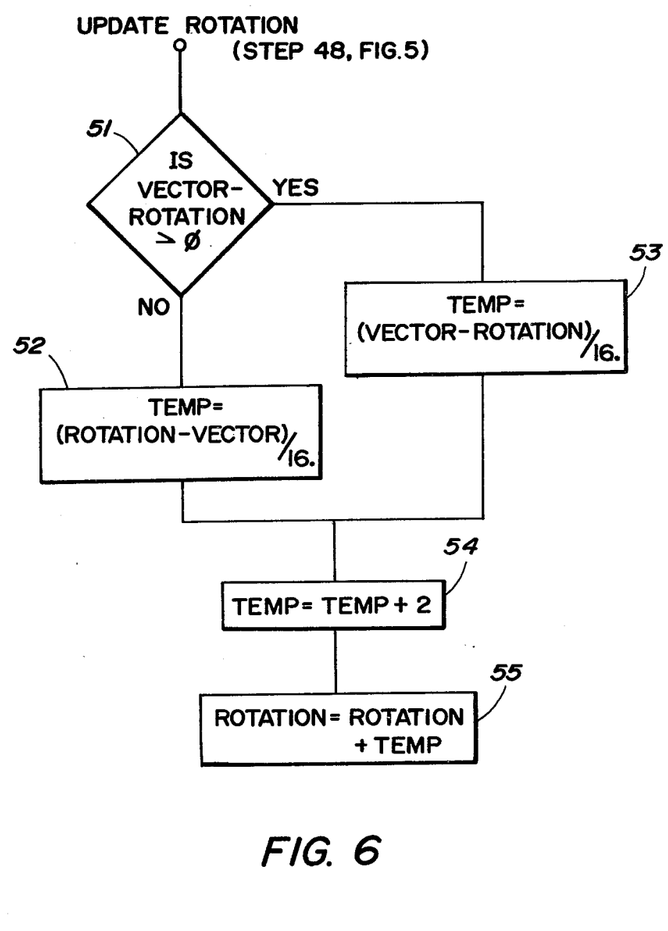
FIG. 6 is a more detailed flow chart of one of the steps of FIG. 5.
Figure 7:
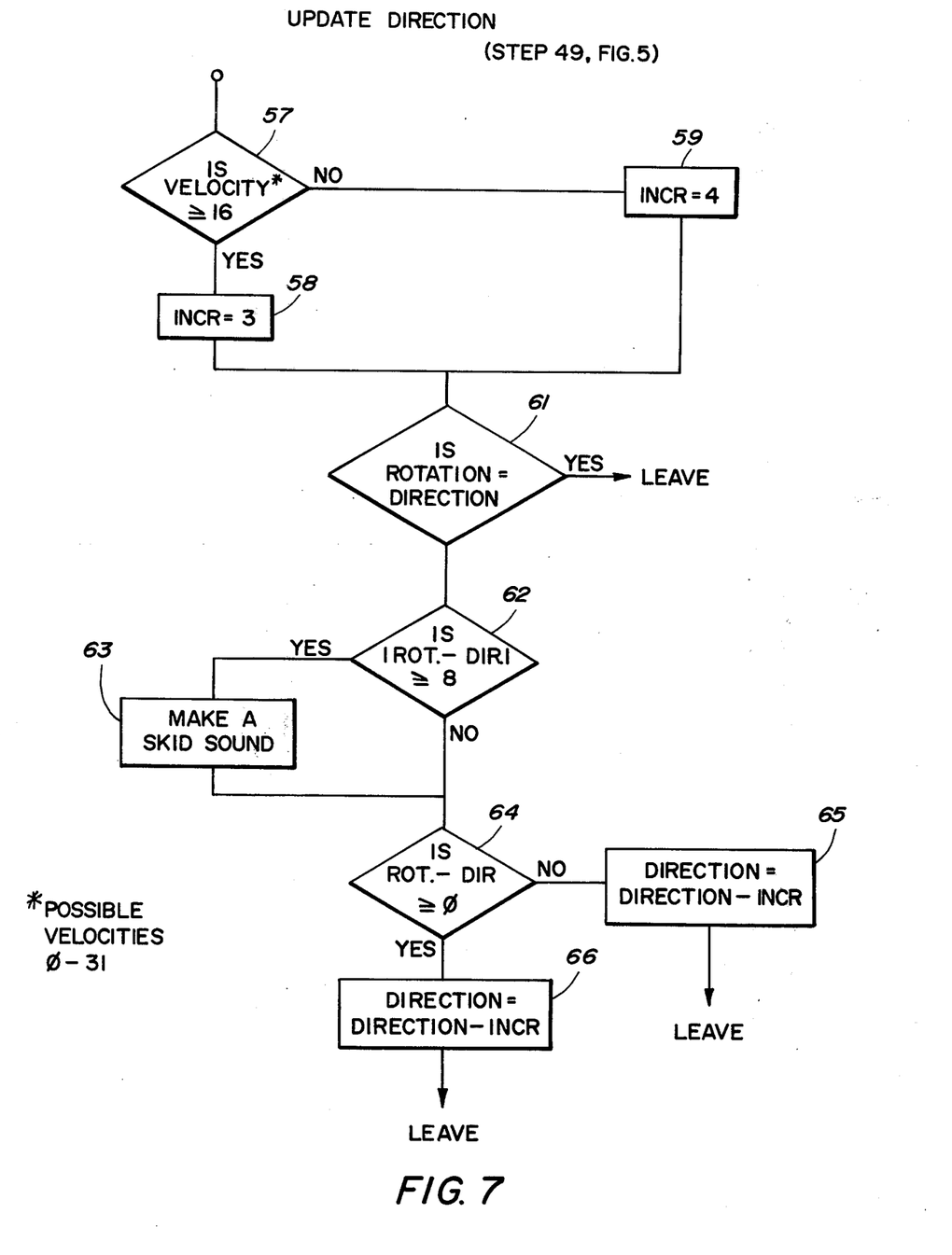
FIG. 7 is a more detailed flow chart of another of the steps of FIG. 5.

The foregoing update steps 48 and 49 are shown in greater detail in FIGS. 6 and 7 respectively. Referring to FIG. 6, step 51 in effect checks the algebraic sign of the difference between the cell vector and present rotation of the car. This difference is divided by decimal 16 in steps 52 or 53, stored in a temporary memory location "TEMP" and a "2" is added in step 54 to prevent ambiguities. Finally in step 55 the rotation of the car is incremented or updated with the contents of "TEMP".

Since the rotation register of 5 bits is not changed until its precision register of 3 bits overflows the "TEMP" amount must be a decimal 8 ($2^3$) before rotation is incremented. In actual practice if there is a 90° rotational difference, "TEMP" will contain approximately a decimal 10.

The flow chart of FIG. 7 updates or increments direction in a smaller amount than rotation. Specifically in step 57 the magnitude of velocity is checked and in steps 58 or 59 increment (INCR) values of 3 or 4 are assigned. If rotation is already equal to direction, then no updating is necessary and step 61 provides an exit. If the absolute difference is significant, steps 62 and 63 provide a skid sound. Step 64 establishes the algebraic sign of the difference and steps 65 or 66 increment direction accordingly with the "INCR" value previously determined in steps 58, 59. Since such value of 3 or 4 is normally smaller than the direction increment of FIG. 6, the present technique models quite realistically a real car in a skid.

Moreover, the skidding algorithm can be varied depending upon which type of effect is desired. For example, a car could be modelled with a certain mass or inertia to cause a car not to respond immediately to the automatic direction vectors which would therefore be anticipatory of the turning movement. This might produce a smoother and more realistic turn.

Execution of the flow chart of FIG. 4 is illustrated by Tables I and II where the assembly mnemonics (the three alpha characters in the left column) address mode and the operand are given for an MOS Technology 6502 microprocessor. The assembly mnemonic is the instruction or operation code for this particular microprocessor and the operand is the fundamental quantity on which the mathematical operation is performed.

TABLE I

| | | | |
|---|---|---|---|
| AUTO: | LDA | I, O | |
| | STA | Z, TEMP1 | |
| | LDA | I, 04 | |
| | STA | Z, TEMP1+1 | ; TEMP1 = P.F. ADDRESS |
| | LDA | ZX, HPOST | |
| | CLC | | |
| | ADC | I, 4 | ; ADD 4 TO GET CENTER OF CAR |
| | LSR | | |
| | LSR | | |
| | LSR | | ; DIVIDE BY 8 |
| | EOR | I, 37 | ; COMPLEMENT IT |
| | CLC | | |
| | ADC | Z, TEMP1 | ; LOW 8 BIT COLUMN OFFSET |
| | STA | Z, TEMP1 | |
| | LDA | I,O | |
| | STA | Z, TEMP2 | ; ZERO TEMPORARY |
| | ADC | Z, TEMP1+1 | ; HIGH 8 BIT COLUMN OFFSET |
| | STA | Z, TEMP1+1 | |
| | LDA | ZX, VPOST | |
| | CLC | | |
| | ADC | I, 4 | ; ADD 4 TO GET CENTER OF CAR |
| | ORA | I, 7 | ; OR IN 3 LSB'S |
| | EOR | I,377 | ; COMPLEMENT IT |
| | ASL | | |
| | ROL | Z, TEMP2 | ; SAVE CARRY |

TABLE I-continued

```
        ASL                    ; MULTIPLY TIMES 4
        ROL     Z, TEMP2       ; SAVE 2 MSB'S
        CLC
        ADC     Z, TEMP1       ; ADD ROW OFFSET TO THE P.F. POINTER
                                 IN TEMP1
        STA     Z, TEMP1
        LDA     Z, TEMP2
        ADC     Z, TEMP1+1
        STA     Z, TEMP1+1
        LDY     I, O
        LDA     NY, TEMP1      ; GET SQUARE OUT OF THE P.F.
        BPL     AU1            ; BRANCH IF NOT A WALL
        ASL
        ASL                    ; IF A WALL MULTIPLY CODE BY 32
        ASL
        ASL
        ASL
        STA     ZX, AUDY       ; SAVE AUTO-DIRECTION CODE
AU1:    RTS
              TEMP1 = TEMPORARY LOCATION
              TEMP2 = TEMPORARY LOCATION
           HPOST = CAR'S HORIZONTAL POSITION ARRAY
            VPOST = CAR'S VERTICAL POSITION ARRAY
             AUDY = CAR'S AUTO-DIRECTION ARRAY
                X- REGISTER CONTAINS CAR # (0→3)
```

TABLE II

```
CNTRL:  JSR     A, AUTO        ; GET AUTO-DIRECTION
        LDA     ZX, VEL
        LSR
        LSR
        LSR
        LSR
        LSR
        CLC
        ADC     I, 1
        STA     Z, TEMP1
        LDY     I, 3
        LDA     ZX, DIRECT     ; CURRENT DIRECTION
        SEC
        SBC     ZX, AUDY       ; DETERMINE IF TURN LEFT OR RIGHT
        AND     I, 370
        BEQ     A6             ; NO TURN IS NEEDED, LEAVE
        BMI     A7             ; BRANCH IF TURN RIGHT (CLOCKWISE)
        LDY     I, 375         ; TURN LEFT (OR COUNTERCLOCKWISE)
A7:     TYA
        CLC
        ADC     ZX, DIRECT     ; UPDATE DIRECTION BY A SMALL
                                 AMOUNT (3)
        STA     ZX, DIRECT
        STX     Z, TEMP3       ; SAVE CAR NUMBER
        ASL     Z, TEMP3
        LDY     Z, TEMP3       ; Y = CAR NUMBER * 2
        STA     AY, ROTATE     ; ROTATE = DIRECTION
        LDA     I, 377
        STA     Z, TEMP1       ; SET ACCELERATION = −1
A6:     LDA     ZX, VEL
        CLC
        ADC     X, TEMP1       ; VEL=VEL+ACCELERATION
        CMP     AX, MAXVEL
        BCC     A10
        LDA     AX, MAXVEL
A10:    STA     ZX, VEL
        JSR     A, UPDATE      : UPDATE POSITION
        RTS
               TEMP1 = TEMPORARY LOCATION
               TEMP3 = TEMPORARY LOCATION
                VEL = CAR'S VELOCITY ARRAY
            DIRECT = CAR'S ACTUAL DIRECTION ARRAY
              AUDY = CAR'S AUTO-DIRECTION ARRAY
             ROTATE = CAR'S ROTATION ARRAY
          MAXVEL = CAR'S MAXIMUM VELOCITY ARRAY
 UPDATE = ROUTINE TO UPDATE POSITION OF EACH CAR ON THE SCREEN
                X-REGISTER CONTAINS CAR # (0→3)
```

Table I is the assembly listing of the routine to access the cell or auto-direction vector corresponding to the playfield position of each car. The various terms used are defined where TEMP1 and TEMP2 are temporary locations in the random access memory of the microprocessor program control unit. TEMP1 is computed to be the playfield address of the particular car 0 through 3 being processed. Each HPOST and VPOST are defined as containing the horizontal and vertical position of the car. HPOST and VPOST are transformed to a playfield RAM address and the vector contained in that memory cell is saved in AUDY. Such transformation is expressed by, $$ADDR = 400_{16} + (-((HPOST+4)/8)) + ((-(VPOST+4).OR.7)*4).$$

Table II is the assembly listing of the routine to use the automatic direction for each car to update the actual direction in an algorithmic manner described above; that is, in small increments rather than full amount in order to provide smooth motion. The definitions include both direction and rotation arrays. In the case of the embodiment of FIG. 4 the rotation and directional arrays are made identically equal. This is illustrated in Table II. In the embodiment of FIG. 5 the direction array is updated more slowly than the rotation array to produce realistic skidding as shown in FIGS. 6 and 7.

In general the use of sine cosine tables in conjunction with velocity and direction is well-known for manually controlled cars and the same technique is utilized here for computing drone car screen positions automatic direction vectors.

A further embodiment of the invention is illustrated in FIG. 3A where four slide type speed control units numbered 1-4 each correspond to a controlled or drone car. In this "slot car" type video game only four drone cars are used. The microprocessor unit controls the steering in accordance with the direction vectors but the players control speed or velocity of their respective cars. Variation in speed will cause path changes and a banking effect around turns to simulate a mechanical slot car game.

In summary, the present invention provides an improved car racing game or for that matter for track type vehicles or slot cars, etc. where the drone cars are simulated in a very realistic manner. This is partially achieved by the discontinuities of the vector orientation initially as laid out in FIG. 1, and in part by the updating of direction and rotation in "small amounts" as discussed in conjunction with both FIGS. 4 and 5. This is almost a necessity upon examination of the playfield of FIG. 1 where in a FIG. 8 track layout the car will encounter automatic direction vectors in perhaps a 90° or 180° opposite direction. However, in accordance with the present invention no abrupt change will occur. Moreover in planning the direction vector layout as shown in FIG. 1, no two vectors are placed so that a car will meet two vectors sequentially going in substantially wrong directions. The obvious reason for this is that a drone car would not take the figure eight path and might be erroneously deflected to only one loop of the figure eight. The specific desired vector pattern is apparent by the figure eight intersection of FIG. 1.

Lastly the imprecision of the binary integers used to represent velocity, position and sinusoids represents substantial round-off error. Thus a cumulative error can easily be built up which provides for greater path variation.

What is Claimed is:

1. A driving game method where a player controlled car is driven on a track with at least one other automatically controlled drone car comprising the following steps: dividing a display field into a plurality of cells for presenting a variety of game indicia including a track and game cars, dividing said track into cells and assigning each cell a direction vector, such vector being assigned different directions in accordance with the change of direction of said track; initiating movement of said cars along said track; intermittently sensing the direction vector of said automatically controlled car which represents its current direction of motion on said track, sensing such cars' cell position on the track, and comparing the car vector to the assigned vector of said cell position; and incrementing said direction vector of said automatically controlled car toward said assigned vector direction.

2. A game method as in claim 1 including the step of prohibiting the drone car from encountering in sequence two cell direction vectors which are radically different from the desired direction of the car.

3. A game method as in claim 1 including the step of determining said track by wall cells which also include direction vectors.

4. A game method as in claim 1 where in said incrementing step changes are less than the possible difference in a comparison of a car vector to an assigned cell vector.

5. A game method as in claim 1 including the step of assigning some vectors a direction deliberately discontinuous with the direction of said track to provide a variable path for said drone car.

6. A game method as in claim 1 wherein said game is of the video type with a raster scan display screen and said step of intermittently sensing said direction vector is performed each video frame.

7. A game method as in claim 1 wherein the assigned number of vector directions is much less than the possible angular orientations of said automatically controlled car.

8. A game method as in claim 7 wherein the assigned number are for eight vector directions and 32 car orientations.

9. A game method as in claim 7 including the step of incrementing car direction less than angular orientation to provide a skidding effect.

10. A driving game method where at least one controlled car is driven on a track comprising the following steps: dividing a display field into a plurality of cells for presenting a variety of game indicia including a track and at least one car, dividing said track into cells and assigning each cell a direction vector, such vector being assigned different directions in accordance with the change of direction of said track; initiating movement of said car along said track; intermittently sensing the direction vector of said car which represents current direction of motion on said track, sensing such car's cell position on the track and comparing the car direction vector to the assigned vector of said cell position; and incrementing said direction vector of said controlled car toward assigned vector direction.

11. A game method as in claim 10 including the step of manually controlling the velocity of said car by a player.

12. A game method as in claim 10 where in said incrementing step changes are less than the possible difference in a comparison of a car vector to an assigned cell vector whereby the path of said car varies as a function of speed and said intermittent sensing.

* * * * *